United States Patent
Geaghan et al.

(10) Patent No.: US 7,362,313 B2
(45) Date of Patent: Apr. 22, 2008

(54) TOUCH SIMULATION SYSTEM AND METHOD

(75) Inventors: Bernard O. Geaghan, Salem, NH (US); Gordon F. Taylor, Bolton, MA (US); Alan H. Field, Topsfield, MA (US)

(73) Assignee: 3M Innovative Properties Company, Saint Paul, MN (US)

( * ) Notice: Subject to any disclaimer, the term of this patent is extended or adjusted under 35 U.S.C. 154(b) by 714 days.

(21) Appl. No.: 10/346,325

(22) Filed: Jan. 17, 2003

(65) Prior Publication Data

US 2004/0140993 A1 Jul. 22, 2004

(51) Int. Cl.
*G09G 5/00* (2006.01)

(52) U.S. Cl. .............. 345/173; 345/174; 345/175; 345/176; 345/177; 345/178; 345/98; 345/99; 345/100

(58) Field of Classification Search ........ 345/173–178, 345/98–100
See application file for complete search history.

(56) References Cited

U.S. PATENT DOCUMENTS

| | | | |
|---|---|---|---|
| 4,575,581 A | | 3/1986 | Langberg |
| 4,686,332 A | | 8/1987 | Greanias et al. |
| 4,725,694 A | | 2/1988 | Auer et al. |
| 5,283,559 A | | 2/1994 | Kalendra et al. |
| 5,376,946 A | | 12/1994 | Mikan |
| 5,650,597 A | | 7/1997 | Redmayne |
| 5,717,321 A | * | 2/1998 | Kerth et al. ............ 323/283 |
| 5,768,492 A | | 6/1998 | Schumer |
| 5,844,506 A | | 12/1998 | Binstead |
| 6,181,328 B1 | | 1/2001 | Shieh et al. |
| 6,236,386 B1 | * | 5/2001 | Watanabe ................ 345/98 |
| 6,353,433 B1 | | 3/2002 | Schumer |
| 6,456,952 B1 | | 9/2002 | Nathan |
| 6,977,646 B1 | | 12/2005 | Hauck et al. |
| 7,034,808 B2 | * | 4/2006 | Sakata et al. .......... 345/173 |
| 2001/0032057 A1 | * | 10/2001 | Smith et al. ............ 702/94 |

FOREIGN PATENT DOCUMENTS

| | | |
|---|---|---|
| EP | 0665508 | 8/2000 |
| JP | 06-175768 | 6/1994 |

OTHER PUBLICATIONS

U.S. Appl. No. 09/998,699, filed Nov. 30, 2001, Touch Screen Calibration System And Method.
U.S. Appl. No. 09/998,614, filed Nov. 30, 2001, System and Method For Locating A Touch On A Capacitive Touch Screen.

* cited by examiner

*Primary Examiner*—Richard Hjerpe
*Assistant Examiner*—Leonid Shapiro

(57) ABSTRACT

Systems and methods provide for simulating an effective touch on a touch screen sensor. A touch screen sensor includes a first surface, an opposing second surface, and one or more electrodes disposed on or proximate to the second surface. Signals are applied to the first and second surfaces in a manner which results in a simulated touch to a particular location of the touch screen sensor. In another approach, a plurality of voltage drive signals are applied at various touch surface regions of the touch screen sensor. A current flow resulting from application of the voltage drive signals is detected as the simulated touch. Touch simulation can be initiated locally or remotely as part of automated monitoring, testing, calibration, and/or servicing procedures. Results of a touch simulation procedure can be acquired and used locally or remotely to assess the operational fitness of the touch screen sensor over time.

60 Claims, 13 Drawing Sheets

TOUCH SIMULATION SYSTEM AND METHOD

FIELD OF THE INVENTION

The present invention relates generally to touch screen sensors and, more particularly, to systems and methods for simulating an effective human touch on a touch screen sensor.

BACKGROUND OF THE INVENTION

A typical touch screen employs a sheet of glass with a conductive coating, such as indium tin oxide, with four corner terminal connections. The touch screen may be configured as a capacitive or resistive touch screen, with a pattern of electrodes made of conductive material. A finger, stylus, or conductive top sheet can draw or inject current at the point of contact. The current can then distribute to the touch panel terminals in a proportionate manner relative to the location of the point of contact.

Touch detection accuracy of the touch screen can change over time due to a number of system and environmental reasons, such as wear during extended use. Monitoring, testing, and servicing of touch screen systems has conventionally involved manual evaluation of a suspect system by an on-site technician. Such conventional evaluation and repair approaches are both costly and time inefficient.

SUMMARY OF THE INVENTION

The present invention is directed to systems and methods for simulating an effective touch on a touch screen sensor. According to one embodiment, a touch screen sensor includes a first surface, a second surface opposing the first surface, and one or more electrodes disposed on or proximate to the second surface. Signals are applied to the first and second surfaces in a manner which results in a simulated touch to a particular location of the touch screen sensor. According to another embodiment, a plurality of voltage drive signals are applied at a plurality of touch surface regions of the touch screen sensor. A current flow resulting from application of the voltage drive signals is detected as the simulated touch.

In accordance with a further embodiment, a touch screen sensor includes a substrate having a first surface and a second surface opposing the first surface, and an electrically conductive structure coupled to, or positioned proximate, the substrate and situated proximate the second surface. First and second signals are respectively applied to the first surface of the touch screen sensor and the electrically conductive structure. A touch on the touch screen sensor is simulated by changing one of the first and second signals relative to the other of the first and second signals. For example, the first and second signals are respectively applied to the first surface and electrically conductive structure to develop a potential difference between the first surface and the electrically conductive structure. A response to the potential difference is detected as the simulated touch.

According to another embodiment, a touch screen sensor includes a first surface, a second surface opposing the first surface, and a plurality of electrodes disposed on or proximate to the second surface. A first signal is applied to the first surface of the touch screen sensor. One of a plurality of second signals is applied to each of the plurality of electrodes disposed on or proximate to the second surface of the touch screen sensor. A touch on the touch screen sensor is simulated by changing a characteristic of at least one of the plurality of second signals relative to the first signal.

In accordance with a further embodiment, a touch sensing system includes a touch screen sensor comprising a substrate having a first surface and a second surface opposing the first surface. The system further includes an electrically conductive structure coupled to, or positioned proximate, the substrate and situated proximate the second surface. A controller is coupled to the touch screen sensor. The controller is configured to apply first and second signals respectively to the first surface of the touch screen sensor and the electrically conductive structure. The controller simulates a touch on the touch screen sensor by changing one of the first and second signals relative to the other of the first and second signals.

According to another embodiment, a touch sensing system includes a touch screen sensor having a first surface, a second surface opposing the first surface, and a plurality of electrodes disposed on or proximate to the second surface. A controller, coupled to the touch screen sensor, is configured to apply a first signal to the first surface of the touch screen sensor and apply one of a plurality of second signals to each of the plurality of electrodes disposed on or proximate to the second surface of the touch screen sensor. The controller simulates a touch on the touch screen sensor by changing a characteristic of at least one of the plurality of second signals relative to the first signal.

In accordance with yet another embodiment, a touch sensing system includes a touch screen sensor comprising a substrate having a first surface and a second surface opposing the first surface. A controller, coupled to the touch screen sensor, is configured to apply a plurality of voltage drive signals at a plurality of regions of the touch screen sensor. The controller detects a current flow resulting from application of the plurality of voltage drive signals as the simulated touch.

Touch simulation can be initiated locally or remotely as part of automated monitoring, testing, calibration, and/or servicing procedures. Results of a touch simulation procedure, such as current and historical touch detection accuracy data, can be acquired and used locally or remotely to assess the operational fitness of the touch screen sensor over time.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

Figure 1:
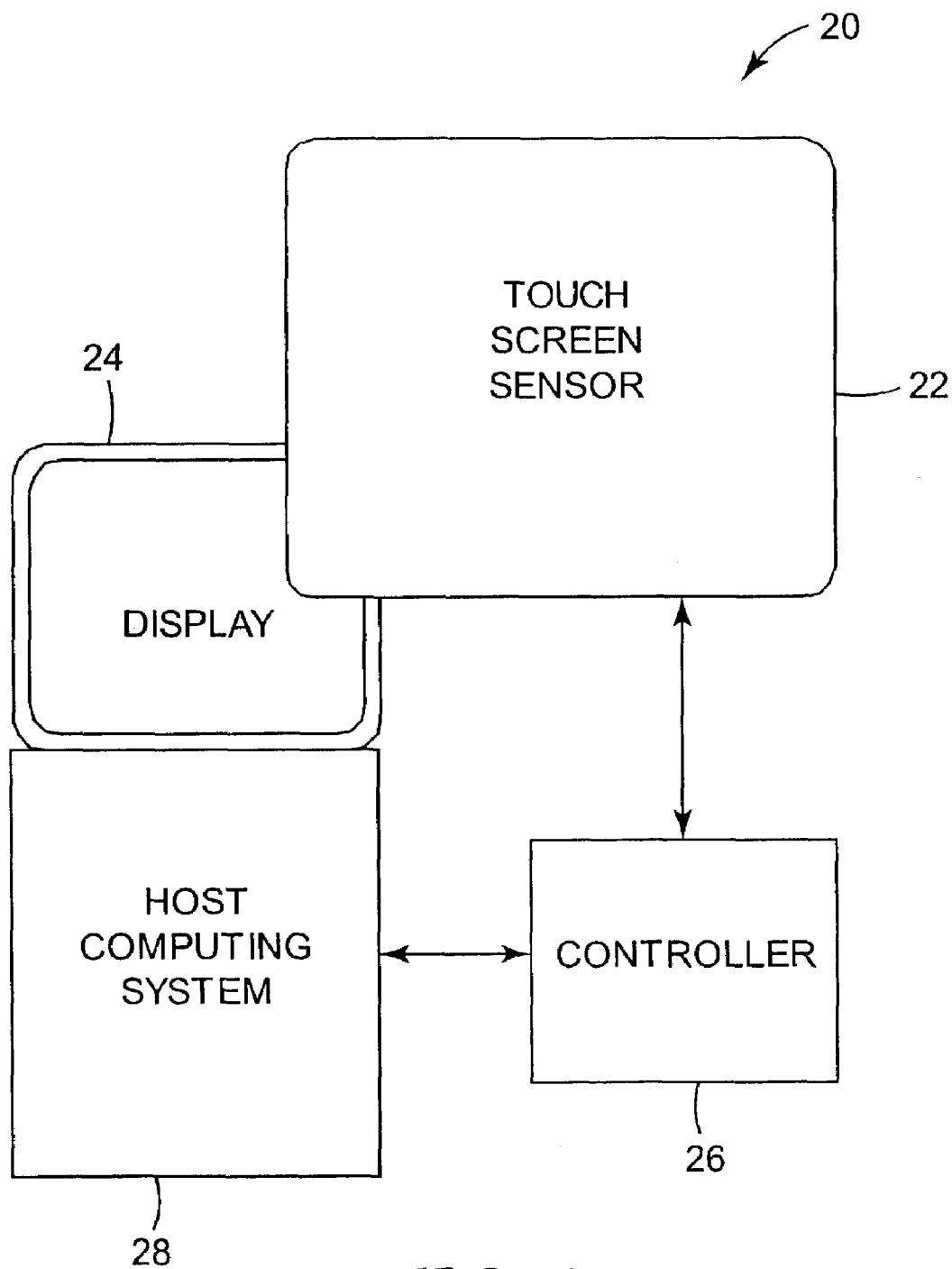
FIG. 1 is an illustration of a touch screen sensor system which employs a touch simulation capability in accordance with an embodiment of the present invention.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF VARIOUS EMBODIMENTS

In the following description of the illustrated embodiments, reference is made to the accompanying drawings which form a part hereof, and in which is shown by way of illustration, various embodiments in which the invention may be practiced. It is to be understood that the embodiments may be utilized and structural changes may be made without departing from the scope of the present invention.

The present invention is directed to systems and methods for simulating a touch on a touch screen sensor. Simulating a touch on a touch screen sensor (TSS) can involve processes effected from, or performed at, a remote site, such as initiating, monitoring, analyzing, or controlling a touch simulation process. Touch simulation methodologies implemented in accordance with the principles of the present invention provide for enhanced diagnostic, calibration, and maintenance capabilities that can be used across a number of differing touch screen sensor technologies, including, for example, capacitive, resistive, and hybrid capacitive/resistive TSS technologies.

It has been found that changes in touch detection accuracy can result during extended use of a given touch screen sensor. For example, changes in the coordinates detected by a given touch screen sensor can result in touch detection inaccuracies resulting from wear, environmental factors, or characteristics of a particular application or system in which the touch screen sensor is implemented. It is important that any such changes in TSS detection accuracy and overall TSS performance be monitored so that recalibration or maintenance on the touch screen systems can be initiated when necessary. Traditionally, a skilled technician typically gathers such data by performing on-site servicing to the touch screen system, often after TSS performance has significantly degraded to a level that adversely impacts use of the system.

A touch simulation approach according to the present invention provides for enhanced monitoring of touch screen sensor performance in a manner that can eliminate the need for on-site testing and servicing by a skilled technician in many cases. Certain embodiments of the present invention provide for local initiation of touch screen sensor diagnostic and calibration tests that involve the simulation of a touch by the TSS controller or a host computing system which incorporates a touch screen sensor. Other embodiments of the present invention provide for remote initiation of touch screen sensor diagnostic and calibration tests that involve the simulation of a touch by the TSS controller or a host computing system which incorporates a touch screen sensor.

Touch simulation in accordance with the present invention can be initiated by software executable by a host computing system which incorporates a touch screen system or by software/firmware executable by a TSS controller. The touch simulation software can be controller locally or remotely via a network connection, for example, preferably at off-peak times, during periods of TSS idleness, or during regularly scheduled maintenance. Each time a touch is simulated, the detected position of the touch can be recorded locally, such as on the host computing system, and stored in a file or database. Over a period of time, changes in the value of the recorded touch can be tracked. Trends can be monitored and, if necessary, maintenance alert messages can be issued. Various operations implicated in TSS monitoring, evaluation, and repair can be performed locally, remotely, or cooperatively via local and remote resources.

An automated touch simulation approach of the present invention provides for a highly repeatable touch that can be simulated at a prescribed screen location with high accuracy. The ability to simulate a touch at a prescribed location with high precision provides for a high resolution of touch detection accuracy. It can be appreciated that human touches made at a prescribed calibration location of a touch screen, for example, can be subject to significant positional inaccuracies, since a repeated human touch rarely occurs in the same location.

Another source of inaccuracies that can adversely affect conventional TSS monitoring and testing approaches involves intended or unintended adjustment to video position, size, and horizontal and vertical dimensions of the display (e.g., cathode ray tube) to which the touch screen sensor is attached. A touch target on the display will move if changes are made to these parameters. When a human uses a predetermined touch target of the display to test for touch coordinate movement, repeatability is virtually impossible.

Touch simulation methodologies of the present invention find utility in a wide variety of applications. For example, entertainment systems can be installed in public locations, such as in arcades, casinos, and bars, where accuracy of touch is essential. At off peak times, or during system startup or shutdown or other predetermined times, a background maintenance program involving a simulated touch can be run, and any changes in touch position can be recorded. Changes over time to the touch position can be monitored, and significant variations can be reported to an operator or owner for servicing. A service engineer can, for example, initiate background maintenance remotely on demand over a computer network or on site. Such background maintenance routines can also be initiated locally or remotely according to a scheduled maintenance program, which may be during periods of detected system idleness or during system startup or shutdown, for example.

A technician can remotely access the TSS system via a network or dial-up connection. By way of example, the TSS system can be accessed via a communication link established between a remote computing system and the controller of the TSS system, assuming the TSS system includes an appropriate communications interface. Alternatively, or in addition, the TSS system can be accessed via a communication link established between the remote computing system and the communications interface of a host computing system which incorporates a TSS system.

Turning now to FIG. 1, there is shown an embodiment of a touch screen sensor (TSS) system which employs a touch simulation capability in accordance with an embodiment of the present invention. The TSS system 20 shown in FIG. 1 includes a touch screen sensor 22 which is communicatively coupled to a controller 26. In a typical deployment configuration, the TSS 22 is used in combination with a display 24 of a host computing system 28 to provide for visual and tactile interaction between a user and the host computing system 28.

It is understood that the TSS 22 can be implemented as a device separate from, but operative with, a display 24 of the host computing system 28. Alternatively, the TSS 22 can be implemented as part of a unitary system which includes a display device, such as a plasma, LCD), or other type of display technology amenable to incorporation of the TSS 22. It is further understood that utility is found in a system defined to include only the TSS 22 and controller 26 which, together, can implement a touch simulation methodology of the present invention.

In the illustrative configuration shown in FIG. 1, communication between the TSS 22 and the host computing system 28 is effected via the controller 26. It is noted that one or more TSS controllers 26 can be communicatively coupled to one or more touch screen sensors 22 and the host computing system 28. The controller 26 is typically configured to execute firmware/software that provides for detection of touches applied to the TSS 22, execution of various calibration and diagnostic routines, and simulation of a touch to the TSS 22 in accordance with the principles of the present invention. It is understood that the functions and routines executed by the controller 26 can alternatively be effected by a processor or controller of the host computing system 28.

In one particular configuration, for example, the host computing system 28 is configured to support an operating system and touch screen driver software. The host computing system 28 can further support utility software and hardware. For example, software can be stored on the host computing system 28 which can be executed to calibrate the touch screen sensor 22 and to configure or setup the TSS 22. It will be appreciated that the various software/firmware and processing devices used to implement touch screen sensor processing and functionality in accordance with the principles of the present invention can be physically or logically associated with the TSS controller 26, host computing system 28, a remote processing system, or distributed amongst two or more of the controller 26, host computing system 28, and remote processing system.

The controller 26, which may be mounted to a separate card and removably installable within the host computing system chassis, typically includes processor and memory devices for storing and executing TSS operating firmware and communication firmware for communicating with the host computing system 28. The TSS 22 can be attached to the display 24 and include a connector interface for connecting with the controller 26.

Figure 2:
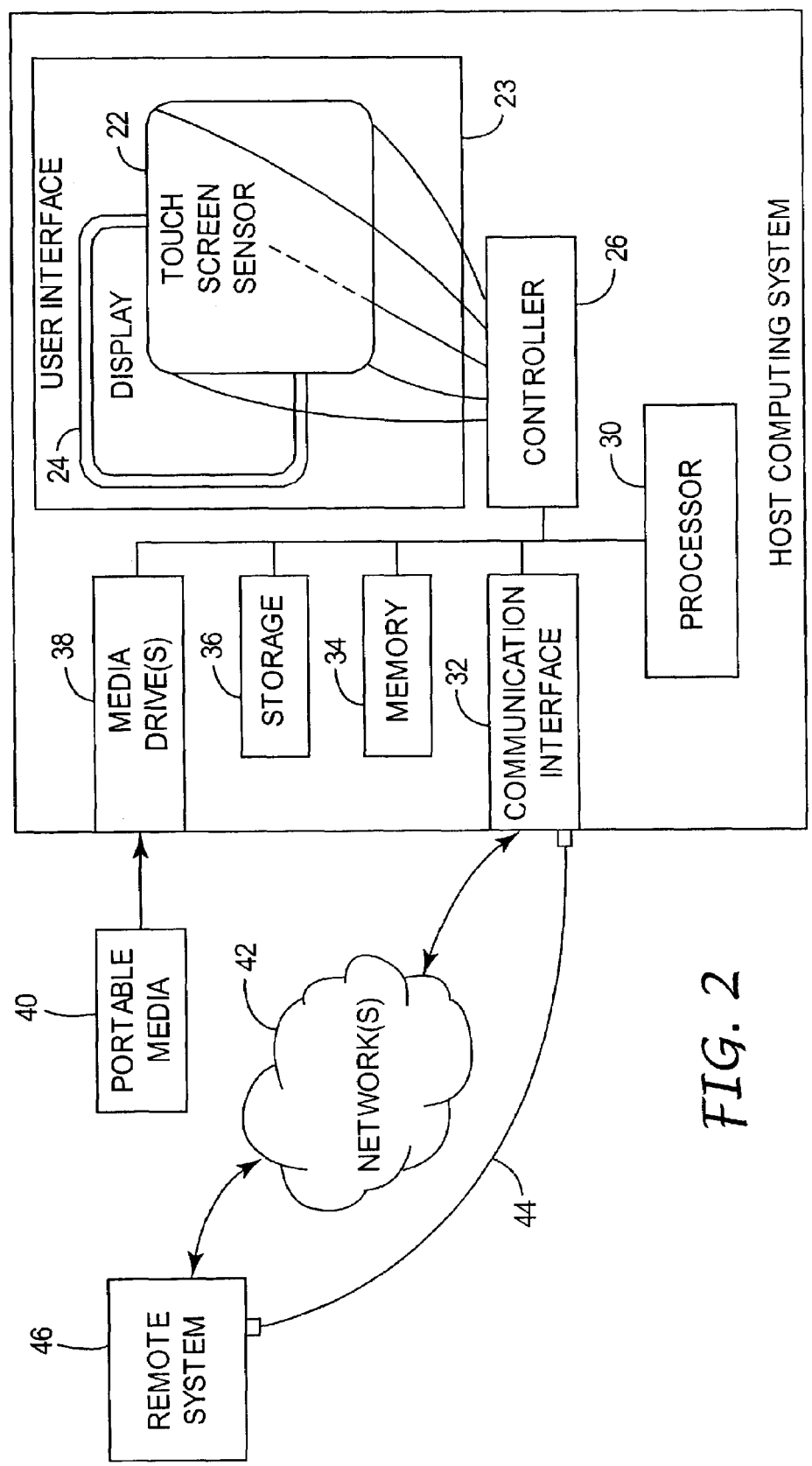
FIG. 2 is an illustration of a touch screen sensor system which employs a touch simulation capability in accordance with another embodiment of the present invention.

In FIG. 2, there is shown a more robust system environment in which a touch screen sensor system and touch simulation methodology of the present invention may find utility. In accordance with this embodiment, the host computing system 28 includes a user interface 23 which incorporates a TSS 22 and a display 24. It is noted that the user interface 23 shown in FIG. 2 can include other user input or interaction devices, including a microphone and a speaker, for example. A controller 26 is shown coupled to the user interface 23. As previously discussed, the controller 26 may be implemented within the host computing system or the user interface 23.

The host computing system 28 further includes one or more media drives 38 which are configured to access (read and/or write) appropriate portable media 40. For example, the media drives 38 may includes one or more of a CD-ROM reader/writer, DVD drive, floppy drive, memory card reader/writer or other type of media drive. The host computing system 28 can also include a mass storage device 36, such as a direct access storage device (e.g., hard drive) or other form of non-volatile digital memory, and system memory 34.

In the configuration shown in FIG. 2, the host computing system 28 includes a communication interface 32 which provides an interface for communicating with a remote system 46 via a communication link. The communication interface 32 may, for example, be configured to include a network interface card (NIC) or other suitable interface for communicating with one or more networks 42. For example, the communication interface 32 can be connected to a local area network which can provide access to one or more public or private networks for communicating with the remote system 46. In this regard, the communication interface 32 may communicate with one or more networks 42 in conformance with known wired or wireless network protocols, including, for example, an IP (e.g., IPv4 or IPv6), GSM, UMTS/IMT, WAP, GPRS, ATM, SNMP, SONET, TCP/IP, ISDN, FDDI, Ethernet or 100Base-X protocol. Communication between the remote system 46 and the communication interface 32 of the host computing system 28 can also be established via a direct wired or wireless communication link 44, such as land line, for example.

The remote system 46 can interact with the host computing system 28 in a wide variety of manners depending on the desired level of services and functionality required for a given application. Such services and functionality can include one or more of remote control of the host computing system 28 and/or TSS controller 26, remote touch simulation, remote monitoring, remote diagnostics, remote calibration, and remote servicing/repair, for example. In most configurations, bidirectional communication is effected between the remote system 46 and the communication interface 32. It is understood, however, that in certain system configurations, it may only be necessary or desired to provide for unidirectional communication between the remote system 46 and the host computing system 28.

Figure 3:
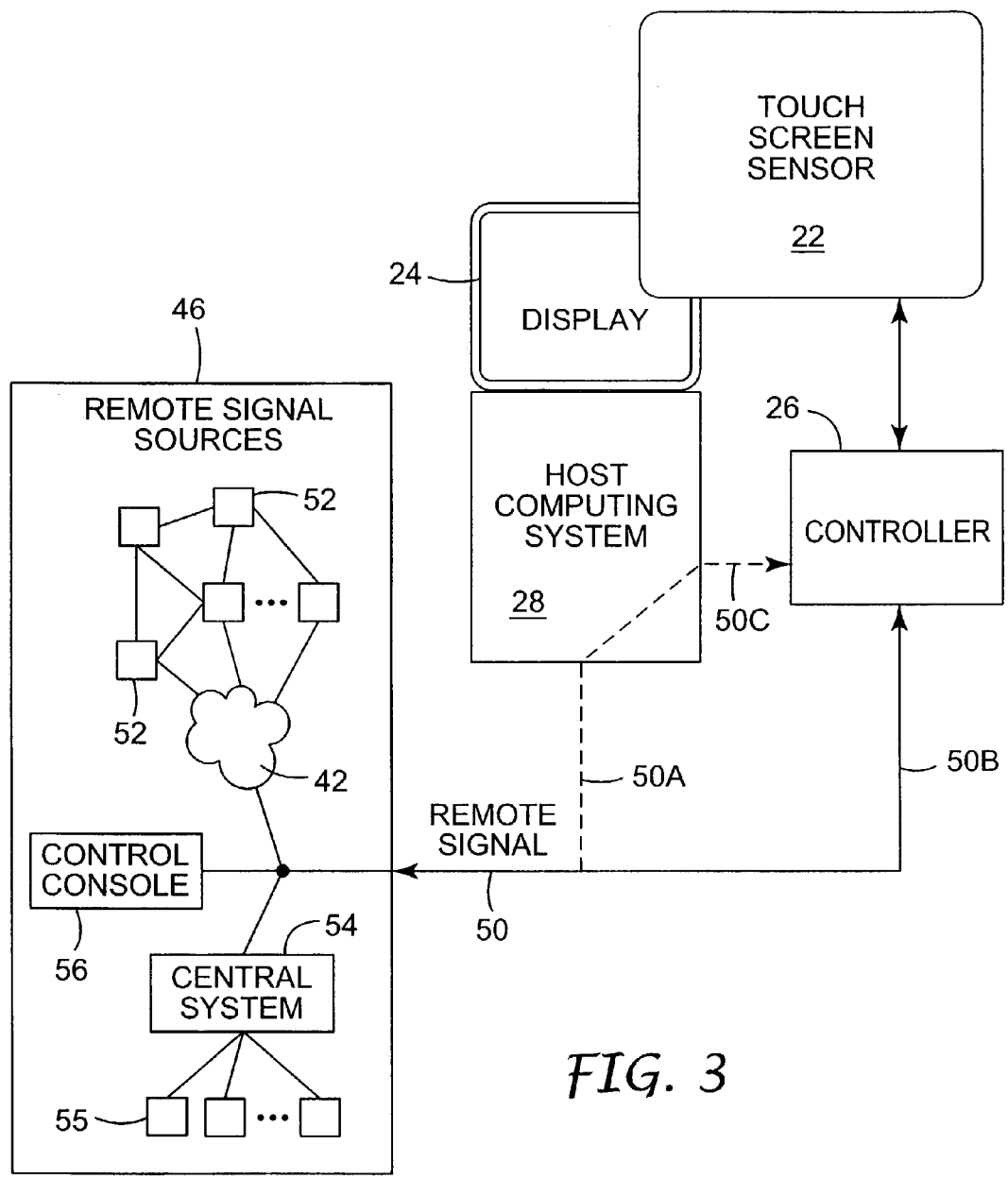
FIG. 3 illustrates a touch screen sensor system which employs a touch simulation capability, including a remote touch simulation capability, in accordance with a further embodiment of the present invention.

Referring now to FIG. 3, there is shown a local host computing system 28, which incorporates a touch screen sensor 22, which is configured to communicate with a remote system 46. In the system configuration shown in FIG. 3, a variety of remote systems 46 are shown for purposes of illustration. The remote system 46 shown in FIG. 3, for example, can be implemented as a control console 56 situated remotely from the host computing system 28. A processing system and/or a human operator at the control console 56 can interact with the controller 26 of the TSS 22 and/or the host computing system 28 via an appropriate communication link. The remote system 46 can also be a node 52 of a network 42. Further, the remote system 46 can be a node 55 of a central system 54.

FIG. 3 further illustrates two possible communication paths by which a remote signal 50 is communicated between the remote system 46 and the TSS controller 26. According to one configuration, the remote signal 50 is communicated between the remote system 46 and TSS controller 26 via the host computing system 28. The remote signal 50 is transmitted and/or received by the host computing system 28 via link 50A. The host computing system 28 transmits and/or receives the remote signal 50 or a processed form/result of the remote signal 50 to/from the TSS controller 26 via link 50C. As such, the TSS controller 26 is indirectly linked with the remote system 46 via the host computing system 28 according to this configuration.

According to another configuration, the remote signal 50 is communicated directly between the remote system 46 and TSS controller 26. The remote signal 50 is transmitted and/or received by the TSS controller 26 via link 50B. In this configuration, the TSS controller 26 is directly linked with the remote system 46 via link 50B. The TSS 26 can communicate with the host computing system 28 over an appropriate connection (e.g., link 50C) if such is needed or desired to support TSS services and functionality. In yet another configuration, the remote signal 50 can be selectively directed to one or both of the host computing system 28 and TSS controller 26 via links 50A and 50B depending on the nature of the remote signal 50 and other considerations.

Figure 4:
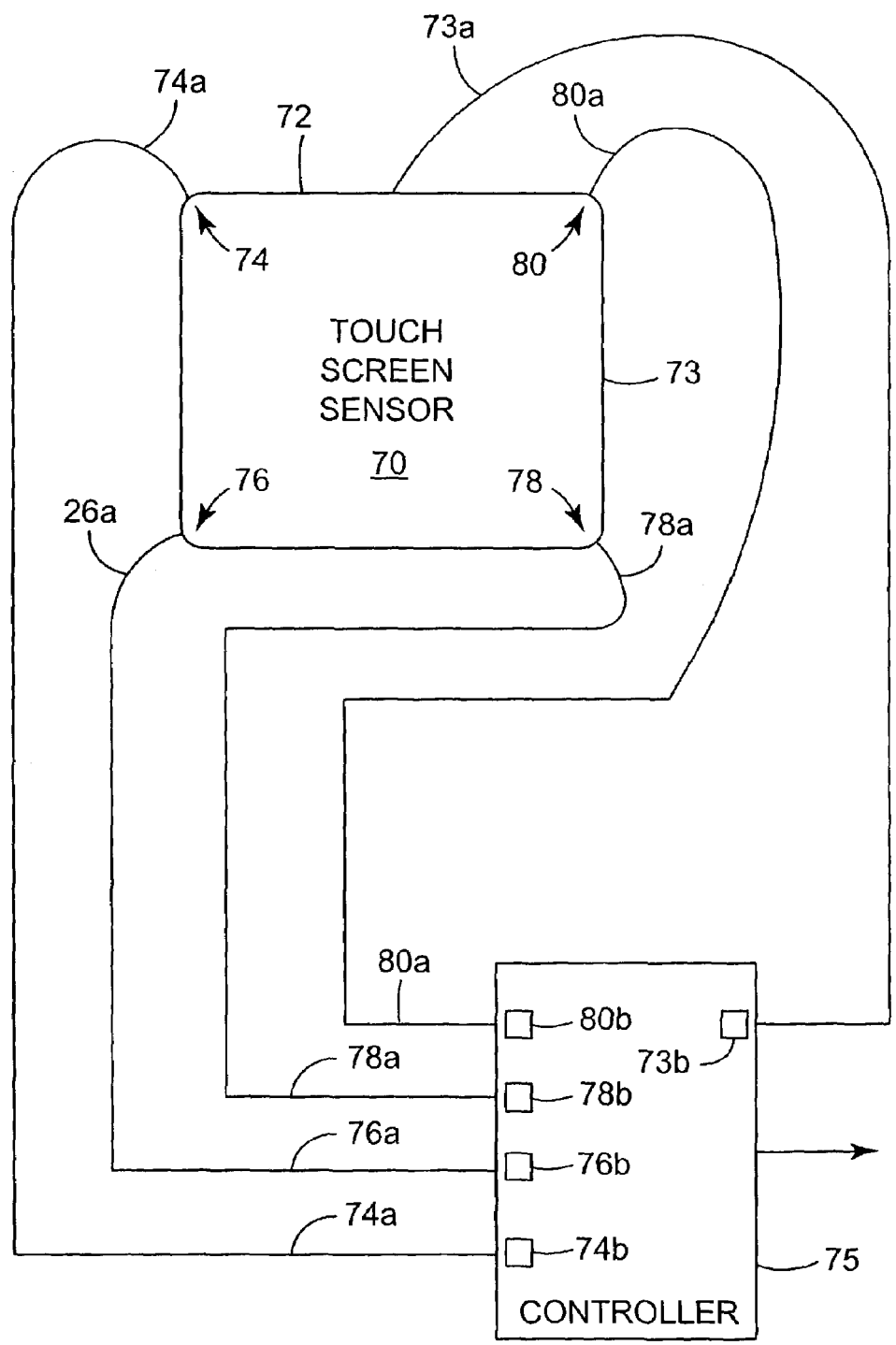
FIG. 4 depicts a touch screen sensor system which employs a touch simulation capability in accordance with an embodiment of the present invention.

Turning now to FIG. 4, there is shown a touch screen sensor 70 electrically coupled to a controller 75 in accordance with an embodiment of the present invention. According to this embodiment, the TSS 70 is implemented as a capacitive touch screen sensor. The TSS 70 includes a substrate 72, such as glass, which has top and rear surfaces 72, 73 respectively provided with an electrically conductive coating. The top surface 72 is the primary surface for sensing touch. The top surface 72 is nominally driven with an AC voltage in the range of about 2.5 V to about 5.0 V. The rear surface 73, which is often referred to as a backshield (e.g., electrical noise shield), is usually driven with the same voltage as the top surface 72 so that the effective capacitance between the top and rear surfaces 72, 73 is reduced to nearly zero.

The TSS 70 is shown to include four corner terminals 74, 76, 78, 80 to which respective wires 74a, 76a, 78a, 80a are attached. Each of the wires 74a, 76a, 78a, 80a is coupled to the TSS controller 75. The wires 74a, 76a, 78a, 80a connect their respective corner terminals 74, 76, 78, 80 with respective drive/sense circuits 74b, 76b, 78b, 80b provided in the controller 75. An additional wire 73a connects a terminal (not shown) disposed on the rear surface 73 with a drive/sense circuit 73b in the controller 75.

The controller 75 controls the voltage at each of the corner terminals 74, 76, 78, 80 and the rear terminal via drive/sense circuits 74b, 76b, 78b, 80b, 73b to maintain a desired voltage on the top and rear surfaces 72, 73. During normal operation, the controller 75 maintains the top and rear surface voltages at substantially the same voltage. A finger or stylus touch force applied to the top surface 72 is detected as an effective small capacitor applied to the top surface 72. The location of the touch on the top surface 72 is determined by current flow measurements made by the controller 75 via corner drive/sense circuits 74b, 76b, 78b, 80b in a manner known in the art.

In accordance with the principles of the present invention, the controller 75 can control the drive/sense circuits 74b, 76b, 78b, 80b, and 73b in a variety of manners in order to simulate a touch on the touch screen sensor 70. As will be described in greater detail, touch simulation can be initiated, monitored, and controlled locally and/or remotely.

According to one approach, the controller 75 simulates the effect of a touch to TSS 70 by adjusting the top and rear surface voltages to develop a potential difference between the top and rear surfaces 72, 73. Developing a potential difference in this manner forces a capacitive effect between the top and rear surfaces 72, 73, which is detected by current flow measurements made at the four corner terminals 74, 76, 78, 80 by the controller 75.

For example, the top surface 72 can be maintained at a nominal operating voltage and the voltage of rear surface 73 can be reduced from the nominal operating voltage, such as to about 0 V for example. The capacitive effect resulting from the potential difference developed between the top and rear surfaces 72, 73 is detected as an effective or simulated touch located approximately at the center of the top surface 72. When this touch simulation process is repeated over time, changes in the detected location of the simulated touch can indicate changes in the accuracy of the touch screen sensing system.

Figure 5:
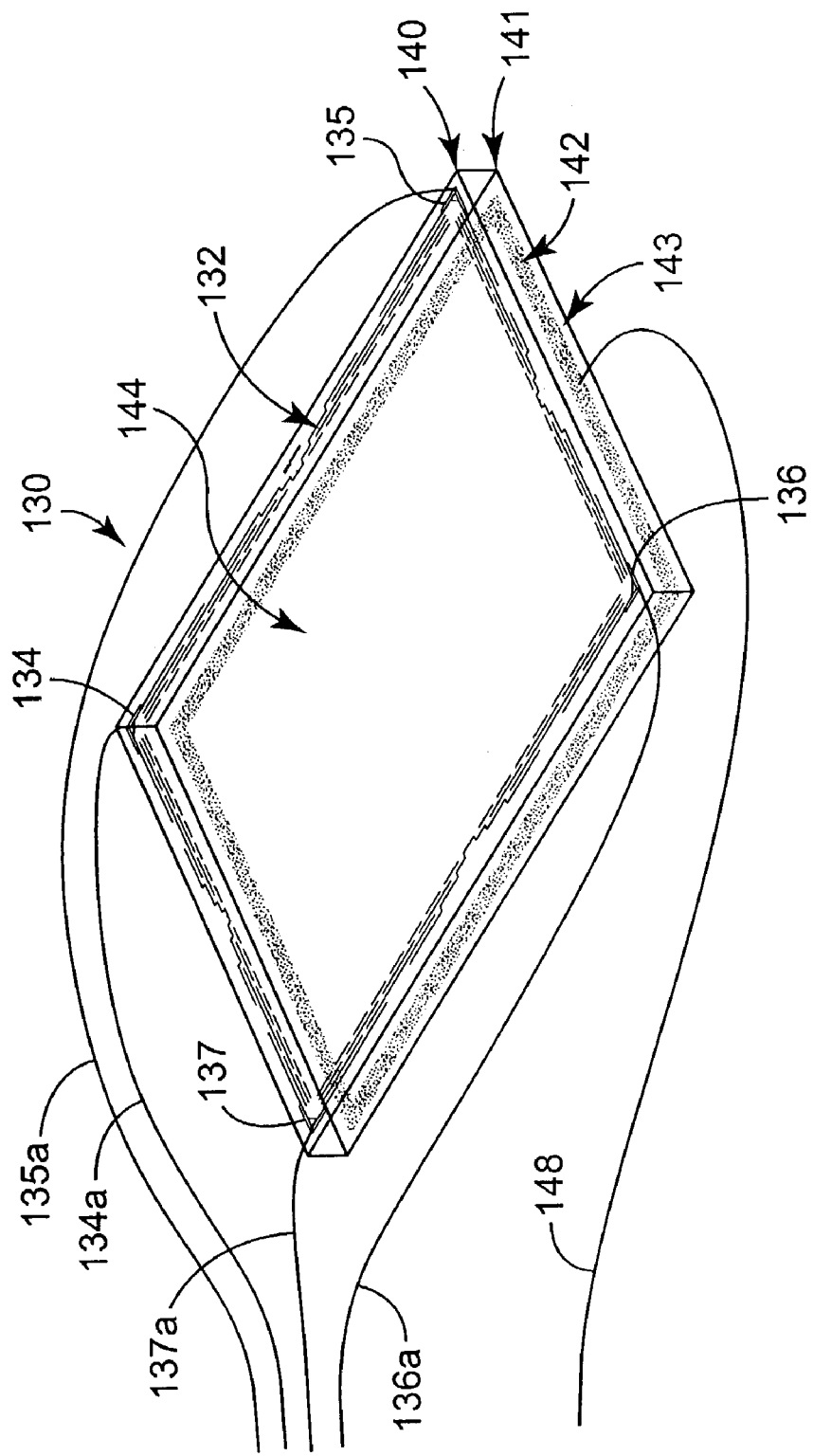
FIG. 5 is an illustration of a touch screen sensor configuration which employs a single rear electrode in accordance with an embodiment of the present invention.

In FIG. 5, there is shown a touch screen sensor configured in accordance with an embodiment of the present invention. According to this configuration, the TSS 130 includes a linearization electrode pattern 132 connected to a top resistive layer 144 which are respectively provided on a top surface 140 of the TSS 130. The linearization electrode pattern 132 is configured to have a generally rectangular shape with four corner terminals 134, 135, 136, 137 respectively connected to a TSS controller (not shown) via wires 134a, 135a, 136a, 137a. A rear electrode 142 makes electrical contact with a rear resistive layer 143 respectively provided on a rear surface 141 of the TSS 130.

In normal operation, drive signals are applied to the corner terminals 134, 135, 136, 137 via respective drive circuits in the controller, and the controller measures currents flowing through the corner terminals 134, 135, 136, 137 via respective sense circuits in the controller. Touch position is then calculated from the measured currents using known methods.

The corner terminals 134, 135, 136, 137 are typically driven with an AC voltage, and the linearization electrodes 132 distribute the voltage evenly across the top resistive layer 144. The rear electrode 142 and rear resistive layer 143 are typically driven with an AC voltage equal to and in phase with the voltage driving corner terminals 134, 135, 136, 137. As such, the rear resistive layer 143 serves as a shield against noise and also minimizes parasitic capacitance effects because negligible capacitive current flows from top resistive layer 144 to rear resistive layer 143. If the voltage on the rear resistive layer 143 is made unequal to that on the top resistive layer 144, an equal change in current flow at corner terminals 134, 135, 136, 137 will result in an apparent touch to the center of the top surface 140 of TSS 130. This simulated touch can be used for diagnostic, calibration, and repair purposes, such as those described herein.

According to a variation of the touch screen sensor configuration depicted in FIG. 5, the TSS 130 can include a rear electrode 142 without inclusion of a rear resistive layer 143. In this configuration, the rear electrode 142 can be used as a partial shield below the linearization electrode pattern 132, which is a highly sensitive area of the touch screen sensor 130. Simulating a touch in the absence of a rear resistive layer 143 is effected by changing the voltage driven onto the rear electrode 142.

Figure 6:
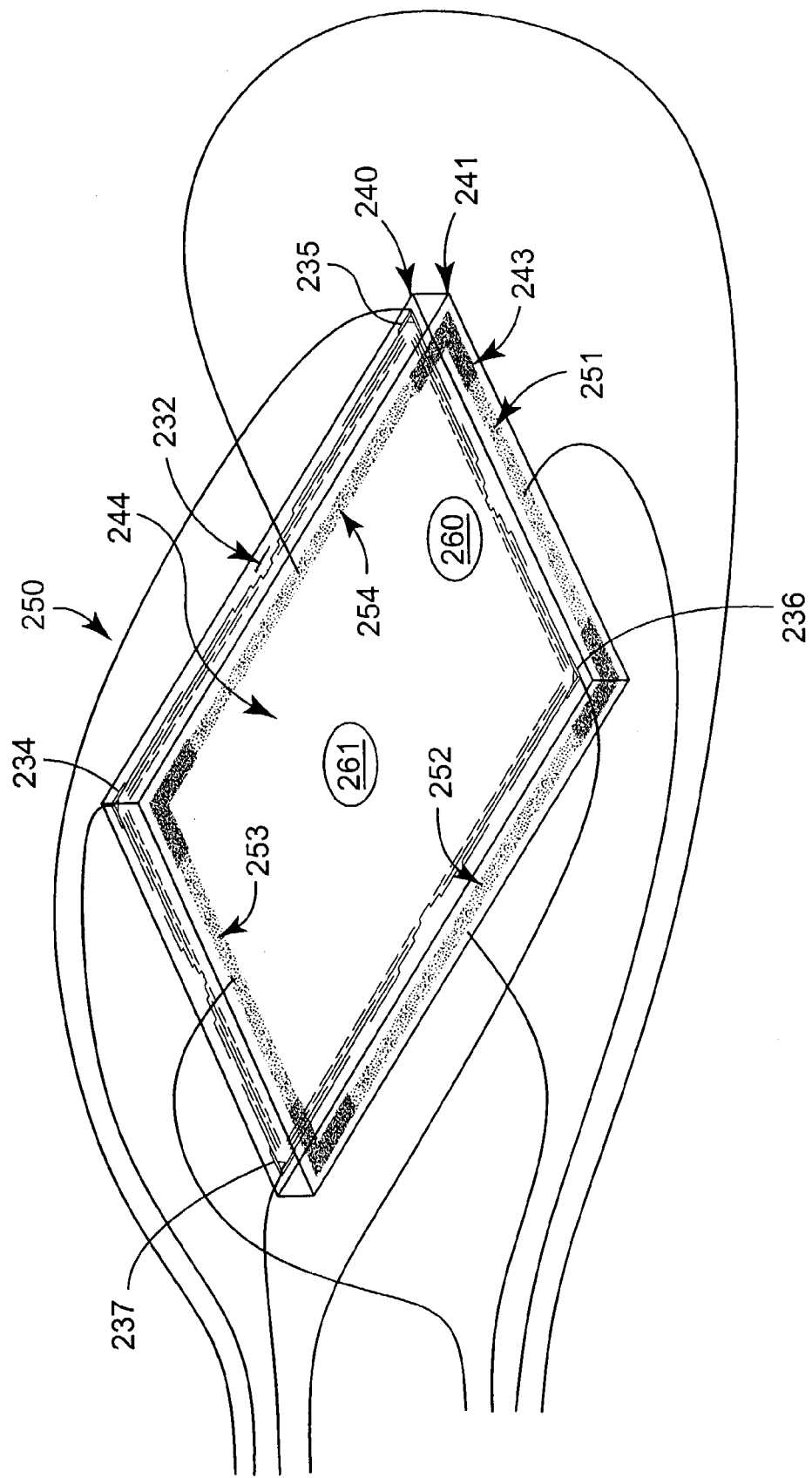
FIG. 6 is an illustration of a touch screen sensor configuration which employs a multiplicity of rear electrodes in accordance with an embodiment of the present invention.

FIG. 6 illustrates another embodiment of a touch screen sensor well suited for implementing a touch simulation methodology of the present invention. According to this embodiment, the touch screen sensor TSS 250 includes a linearization electrode pattern 232 connected to a top resistive layer 244 which are respectively disposed on a top surface 240 of the TSS 250. The linearization electrode 232 includes four corner terminals 234, 235, 236, 237 respectively connected to a TSS controller (not shown) via wires 234a, 235a, 236a, 237a. The rear electrode arrangement in the embodiment of FIG. 6 includes a number of discrete rear electrodes situated on the rear surface 241 of the TSS 250. In the particular configuration shown in FIG. 6, four rear electrodes 251, 252, 253, 254 are located about the perimeter of the rear surface 241, with one of the rear electrodes situated along one of the edge regions of the rear surface 241 of the TSS 250. It is understood that the number and location of the rear electrodes can vary depending on a particular TSS design. As illustrated, rear electrodes 251, 252, 253, 254 make electrical contact with a rear resistive layer 243 provided on the rear surface 241 of the TSS 250.

In a configuration in which multiple rear electrodes are employed, as is the embodiment shown in FIG. 6, the controller (not shown) drives the rear electrodes 251, 252, 253, 254 with an AC voltage equal to that applied at corner terminals 234, 235, 236, 237. When controlled in this manner, the multiple rear electrodes 251, 252, 253, 254 effectively perform the same function as the single rear electrode 142 in the TSS embodiment depicted in FIG. 5.

Figure 13:
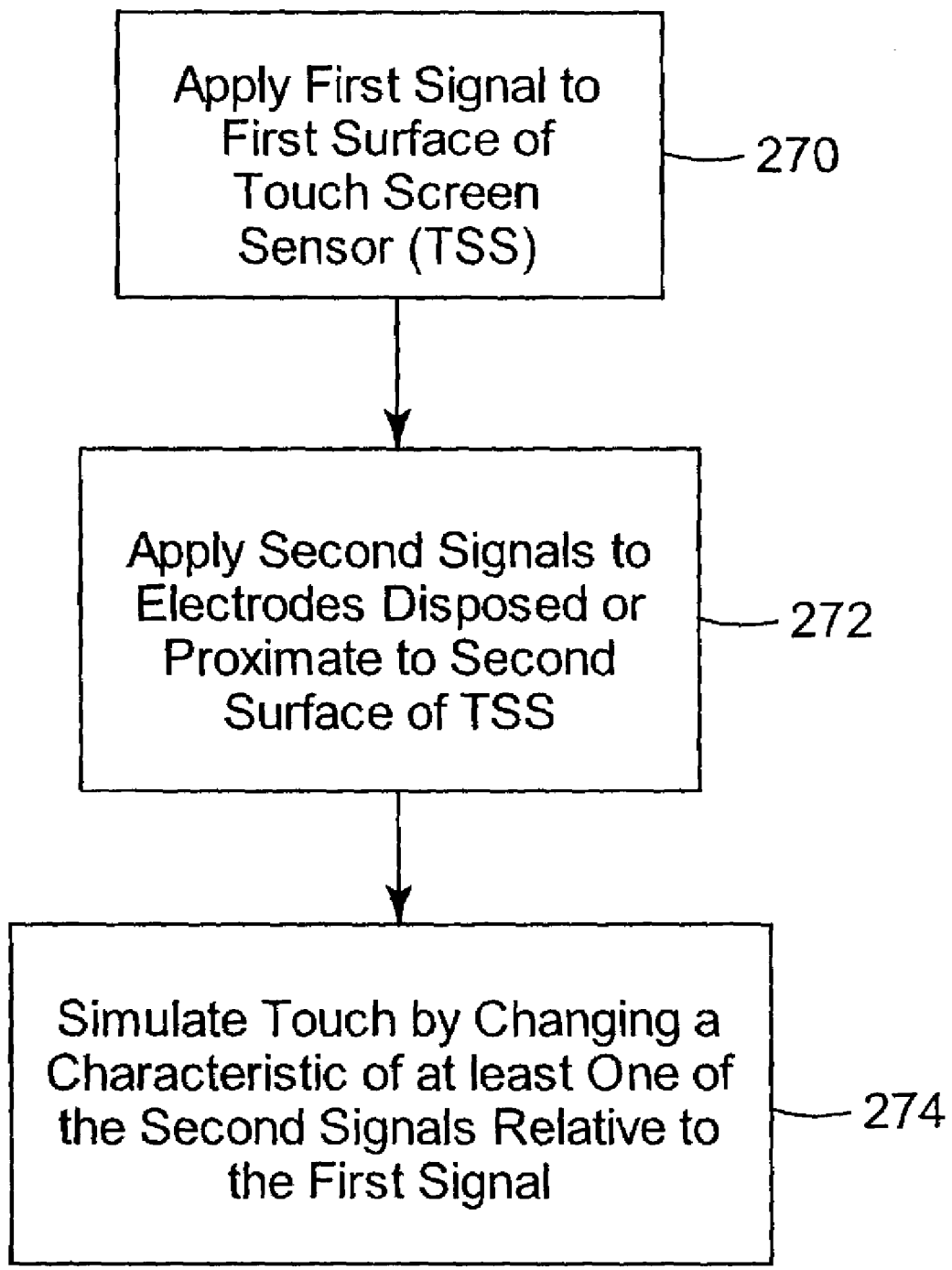
FIG. 13 is a flow diagram of a methodology for simulating a touch on a touch screen sensor in accordance with an embodiment of the present invention.

In a diagnostic mode, touch simulation can be effected by varying a number of drive signal parameters, such as amplitude, phase, and frequency, relative to one another. According to one approach, and as illustrated in FIG. 13, the controller can apply 270 a first signal to a first surface of the touch screen sensor. The controller applies 272 second signals to the multiple electrodes disposed on or situated proximate the a second surface of the TSS. The controller simulates 274 a touch to the TSS by changing a characteristic of at least one of the second signals relative to the first signal.

For example, and with reference to FIG. 6, the rear electrodes 251, 252, 253, 254 can be driven with voltages differing in amplitude relative to voltages applied to other rear electrodes and/or the corner terminals 234, 235, 236, 237 on the top surface 240 of the TSS 250. The rear electrodes 251, 252, 253, 254 can be driven with voltages differing in phase relative to voltages applied to other rear electrodes and/or the corner terminals 234, 235, 236, 237 on the top surface 240. Further, the rear electrodes 251, 252, 253, 254 can be driven with voltages differing in frequency relative to voltages applied to other rear electrodes and/or the corner terminals 234, 235, 236, 237 on the top surface 240.

By way of example, rear electrodes 252 and 254 can be undriven, while rear electrode 251 is driven with a voltage out of phase with the voltage applied to corner terminals 234, 235, 236, 237 on the top surface 240, and rear electrode 253 can be driven with a voltage in phase with the voltage applied to the corner terminals 234, 235, 236, 237. In this illustrative example, a simulated touch will be located at point 260 shown in FIG. 6. By way of further example, the controller can drive the rear electrodes 251, 252, 253, 254 at DC, or at equal voltages, of the same frequency, and further drive the corner terminals 234, 235, 236, 237 on the top surface 240 at a voltage unequal to that applied to the rear electrodes 251, 252, 253, 254. This simulated touch, using this approach, will be located at the center of the top surface 240 at point 261.

Independent rear electrodes, such as rear electrodes 251, 252, 253, 254 shown in FIG. 6, can be used to simulate a touch with or without the presence of rear resistive layer 243. If rear resistive layer 243 is not present, higher drive voltages must typically be applied to the rear electrodes in order to simulate a touch.

Figure 11:
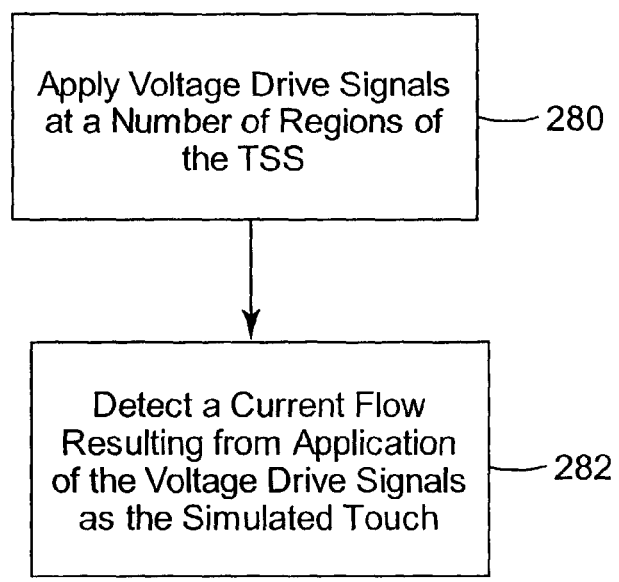
FIG. 11 is a flow diagram of a methodology for simulating a touch on a touch screen sensor in accordance with a further embodiment of the present invention.

In accordance with another approach, a non-capacitive technique can be employed to simulate a touch on a touch screen sensor. In a system such as that shown in FIGS. 5 and 6, this non-capacitive simulated touch technique can be employed in the presence or absence of one or both of the rear resistive layer and rear electrode(s). According to this approach, and with reference to FIG. 11, a voltage drive signal can be applied 280 at a number of regions of the touch surface of the TSS. A current flow resulting from application of the voltage drive signals is detected 282 as the simulated touch.

Figure 12:
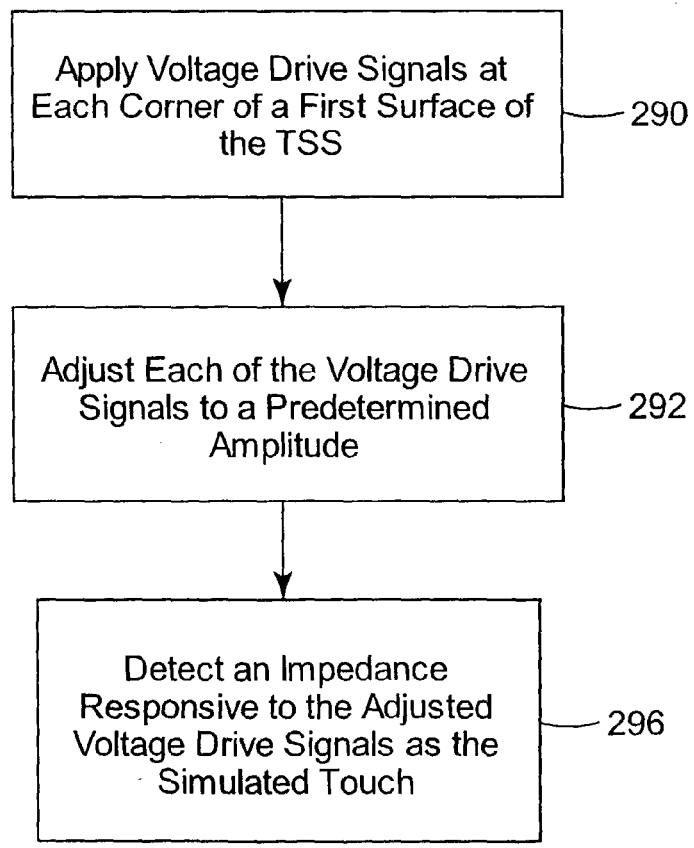
FIG. 12 is a flow diagram of a methodology for simulating a touch on a touch screen sensor in accordance with yet another embodiment of the present invention.

By way of example, and with particular reference to FIGS. 6 and 12, the controller (not shown) can vary 292 the levels of the drive signals applied 290 to the corner terminals 234, 235, 236, 237 on the top surface 240 relative to one another, and measure the resulting current flows at each of the corner terminals 234, 235, 236, 237. The controller can then measure the current from each of the corner terminals 234, 235, 236, 237 relative to one another. In this way, a simulated touch can be generated 296.

For example, the controller can increase the drive voltage on all four corner terminals 234, 235, 236, 237 on the top surface 240 to simulate a touch to point 61 at the center of TSS 250. The controller can also increase the drive voltage on corner terminals 235 and 236 relative to the drive signals applied to corner terminals 234 and 237, while maintaining a constant touch detect threshold. This will result in a simulated touch at point 260.

Figure 7:
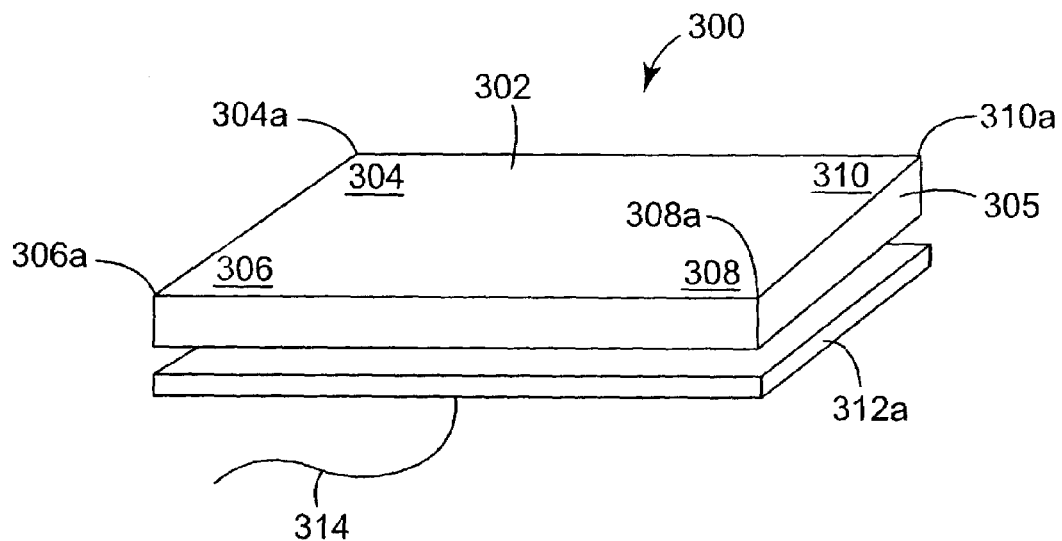
FIG. 7 is an illustration of a touch screen sensor configuration which employs an electrically conductive structure situated proximate a rear surface of the touch screen sensor in accordance with an embodiment of the present invention.
Figure 8:
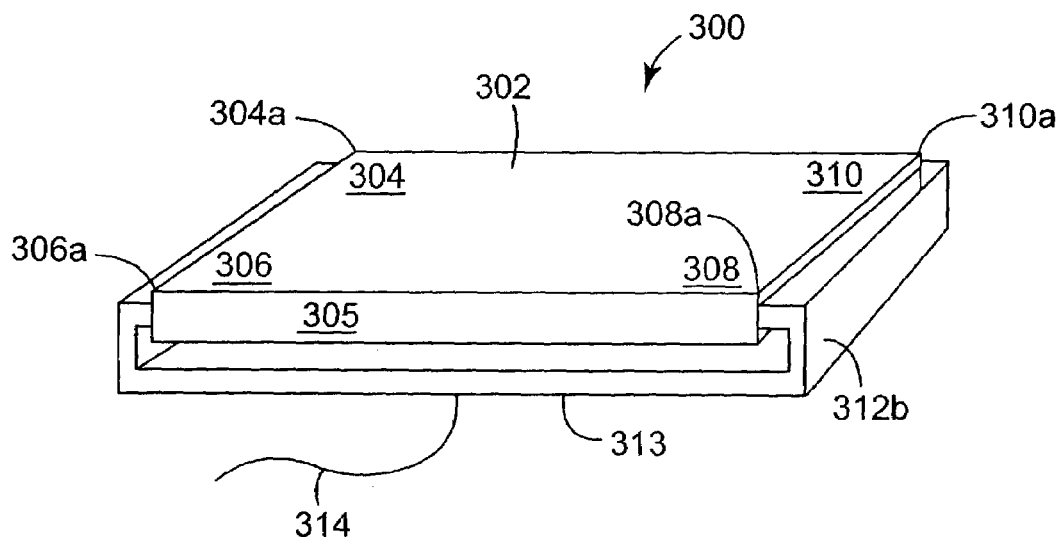
FIG. 8 is an illustration of a touch screen sensor configuration which employs an electrically conductive frame situated proximate a rear surface of the touch screen sensor and contacting side surfaces of the touch screen sensor in accordance with an embodiment of the present invention.

Referring now to FIGS. 7 and 8, two embodiments of a touch screen sensor are shown, each of which incorporates an electrically conductive structure which is either coupled to, or positioned proximate, the substrate of the touch screen sensor. In the arrangements shown in FIGS. 7 and 8, an electrically conductive structure, which is electrically isolated from the touch screen sensor substrate, is used in combination with the touch screen sensor substrate to effect touch simulation in accordance with the principles of the present invention. The electrically conductive structure can also be effectively used as a backshield to provide for shielding from electrical noise.

In the embodiments shown in FIGS. 7 and 8, a touch screen sensor 300 includes a substrate 305 having a top surface 302 provided with a conductive coating. Corner terminals 304, 306, 308, 310 are electrically connected to the top conductive surface 302 and a controller (not shown) via wires 304a, 306a, 308a, 310a. The TSS 300 can include one or more rear surface electrodes, and may include or exclude a rear resistive layer, as in the configurations shown in FIGS. 5 and 6. Alternatively, or in addition, the electrically conductive structure can include one or more electrodes (e.g., 4 electrodes), each of which is coupled to the controller via a respective wire.

In the embodiment shown in FIG. 7, an electrically conductive structure 312a, such as a thin conductive plate or foil, is situated in a spaced apart relationship with respect to the TSS substrate 305. For example, the conductive structure 312a may be positioned about ⅛" from the TSS substrate 305. The conductive structure 312a is electrically coupled to the controller via a wire 314.

FIG. 8 shows an embodiment in which an electrically conductive structure 312b represents a frame that provides structural support for the TSS 300. The frame 312b may, for example, be configured for mounting the TSS 300 within a chassis of a system which incorporates the TSS 300. The frame 312b is coupled to an edge portion of the TSS substrate 305, with an appropriate coating or material provided to electrically insulate the electrically conductive portion of the frame 312b from the TSS substrate 305. The electrically conductive plate surface 313 of the frame 312b is situated in a spaced apart relationship with respect to the TSS substrate 305. The plate surface 313 of the frame 312b is electrically coupled to the controller via a wire 314.

Figure 9:
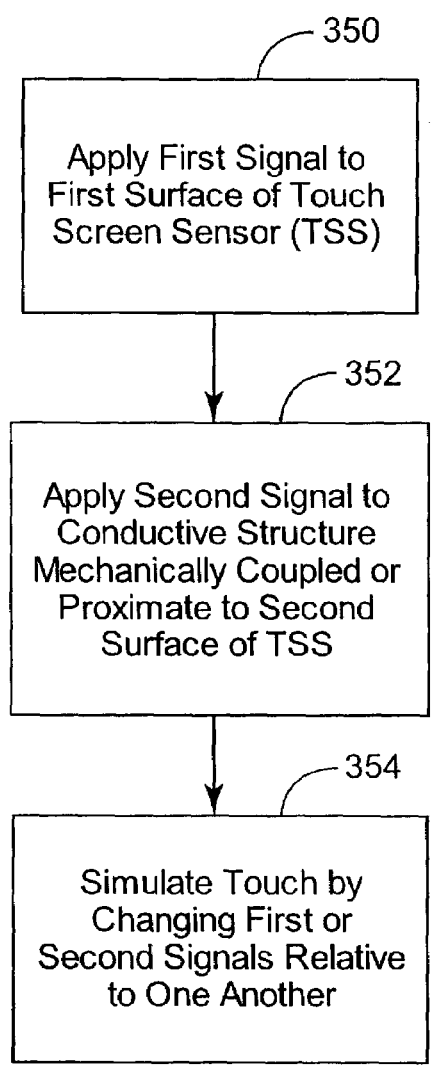
FIG. 9 is a flow diagram of a methodology for simulating a touch on a touch screen sensor in accordance with an embodiment of the present invention.

According to one touch simulation approach, and as depicted in flow diagram form in FIG. 9, the controller can apply 350 a first signal to the top surface 302 of the touch screen-sensor 300. The controller can apply 352 a second signal to the electrically conductive structure 312a/b proximate or coupled to the touch screen sensor 300. A touch on the touch screen sensor is simulated 354 by the controller changing one of the first and second signals relative to the other of the first and second signals.

Figure 10:
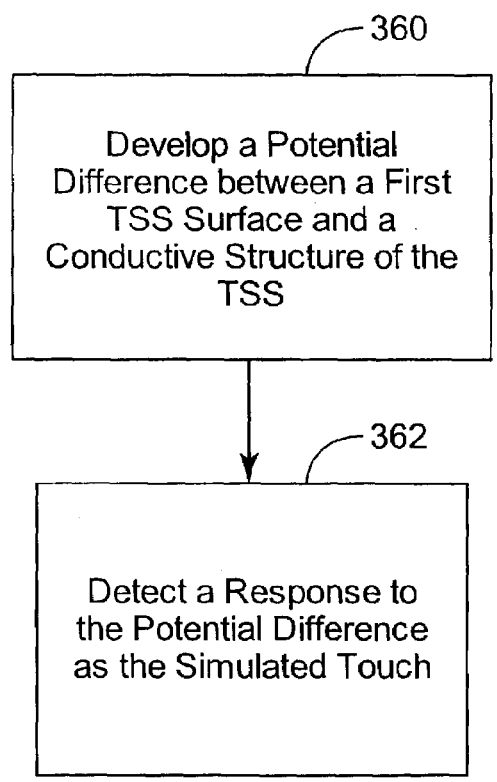
FIG. 10 is a flow diagram of a methodology for simulating a touch on a touch screen sensor in accordance with another embodiment of the present invention.

As was described previously, the controller can simulate a centered or non-centered touch on the TSS substrate 305 by varying one or more parameters of the first and second signals, including one or more of the amplitude, phase, and frequency of the drive signals. For example, and with reference to FIG. 10, the controller applies drive signals to the TSS substrate 305 and the electrically conductive structure 312a/b to develop 360 a potential difference there between. A response to the potential difference is detected 362 as the simulated touch.

Figure 14:
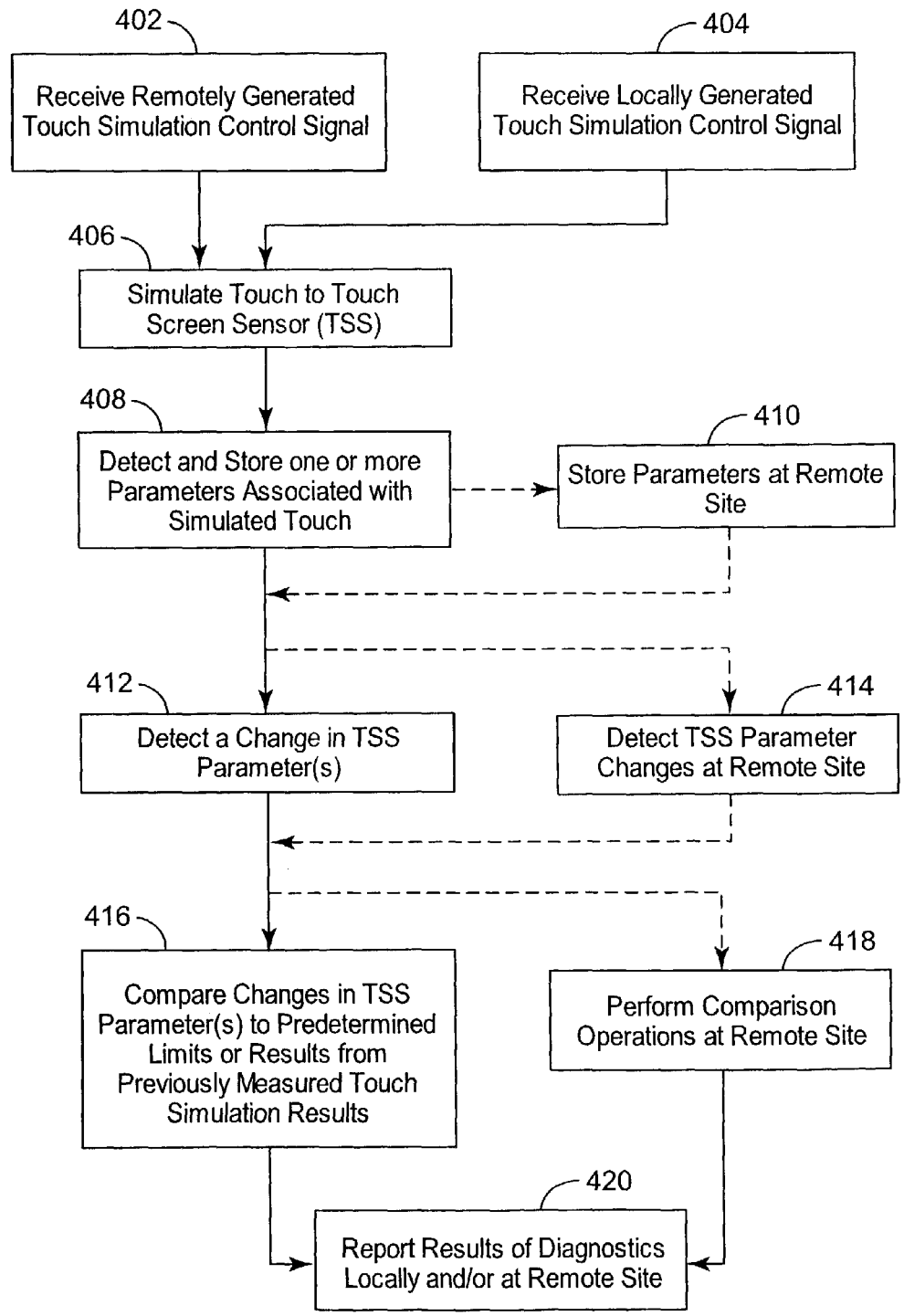
FIG. 14 is a flow diagram of a methodology for remotely or locally initiating simulation of a touch on a touch screen sensor in accordance with an embodiment of the present invention.

As is shown in the embodiment illustrated in FIG. 14, touch simulation can be initiated, monitored, and controlled locally, remotely, or both locally and remotely. As shown in FIG. 14, a remotely or locally generated touch simulation control signal is received 402, 404 by the controller of the touch screen sensor. A simulated touch is produced 406 in a manner previously discussed. One or more parameters associated with the simulated touch are detected and stored 408. A non-exhaustive list of such parameters include change in current, impedance, phase, voltage, or frequency; pr a change in the relationship (e.g., ratio) of currents, impedances, phases, voltages, or frequencies. The parameters may be stored locally or at the remote site 410.

The parameters associated with touch simulation are acquired over a period of time. In one approach, the TSS controller or processor of a host computing system analyzes the stored touch simulation parameters and detects a change, if any, in such parameters. It is noted that this analysis may also be performed at the remote site. A change in a given touch simulation parameter beyond a predetermined limit or range can be indicative of a problem with the touch screen sensor, such as a change in touch detection accuracy. Analysis and detection of the TSS parameters can be performed locally 412, remotely 414, or cooperatively at local and remote sites.

For example, a change detected in a particular TSS parameter can be compared 416 to a predetermined limit or result established from a previously measured touch simulation limit or result. The comparison operation can be performed locally, remotely 418, or cooperatively at local and remote sites. Results from a diagnostics procedure performed at the touch screen sensor can be stored and reports generated 420 locally and/or at the remote site.

Figure 15:
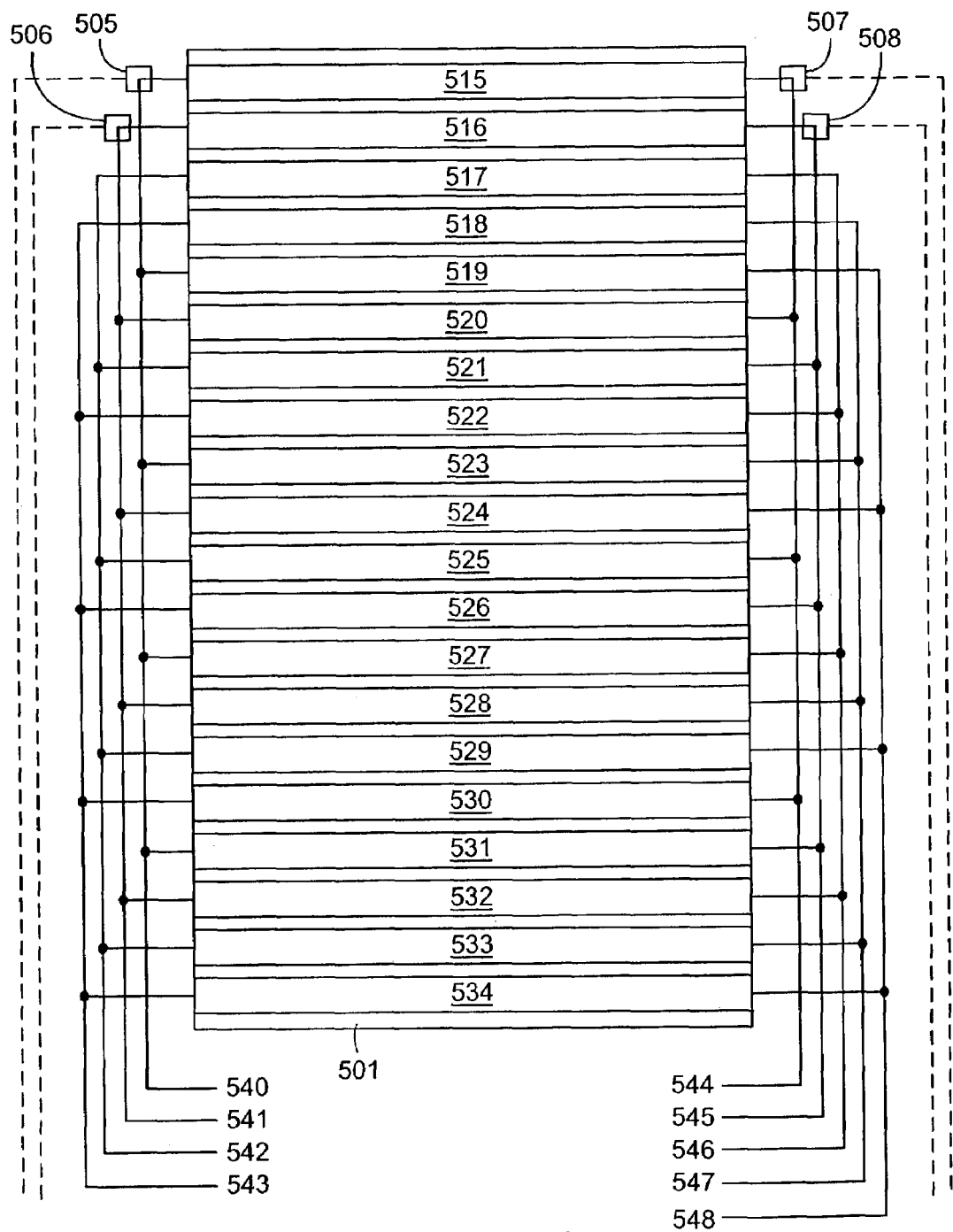
FIG. 15 is a simplified schematic of an near field imaging (NFI) capacitive touch screen sensor configured for automated touch simulation in accordance with an embodiment of the present invention.

As was discussed previously, touch simulation methodologies of the present invention can be implemented in a wide range of touch screen sensor technologies. By way of further example, touch simulation methodologies in accordance with the present invention can be implemented in a near field imaging (NFI) capacitive touch screen sensor. A simplified schematic of an NFI capacitive touch screen sensor is illustrated in FIG. 15.

The NFI capacitive touch screen sensor includes conductive ITO (indium-tin-oxide) bars 515 through 534, deposited on substrate 501, which define the touch sensitive surface. Bar connections 540 through 548 connect the ITO bars to an electronic controller (not shown).

A touch is detected by activating bars 515-534 with an AC signal, and measuring changes in current flowing in connections 540-548 due to capacitive coupling from one or more bars to a finger or stylus in proximity to the bar(s). Vertical position is determined by the relative magnitude of the change in current among the bars. Horizontal position is determined by measuring the ratio of current change in a bar between its left side connection (540-543) and its right side connection (544-548). Additional details of an NFI capacitive touch screen sensor of the type depicted in FIG. 15 are disclosed in U.S. Pat. No. 5,650,597, and in commonly owned U.S. Ser. No. 09/998,614, filed Nov. 30, 2001, which is hereby incorporated herein. Touch may be simulated in this system by adding simulation electrodes 505, 506, 507, 508 in proximity to the left and right ends of selected bars or in proximity to the bar connections as shown. These added electrodes may be placed on or in proximity with the rear surface of substrate 501, or they may be placed in front of bar ends or connections 540-548. The added electrodes are connected to the electronic controller (not shown). Four simulation electrodes are shown in FIG. 15 for simplicity, though one simulation electrode may be placed at the end of each connection 540-548. During normal touch detection, simulation electrodes may be electrically disconnected, or driven with a signal that is equal in magnitude and phase with the signals driven onto connections 540-548.

A touch may be simulated by driving one of the left side simulation electrodes 505, 506 and one of the right side simulation electrodes 507, 508 with a signal that is unequal to the signals driven onto lines 540-548. Simulation electrodes may be grounded, or driven with an AC signal that is a different magnitude or out of phase with the signals on lines 540-548. For example, grounding electrodes 505 and 507 will result in a simulated touch in the center of bar 515. Driving electrode 517 with an AC signal equal in magnitude and in phase with the signals on lines 540-548, while grounding electrode 505, results in a simulated touch near the left end of bar 515. Grounding electrodes 505 and 508 simulates a touch to the center of bar 531.

Figure 16:
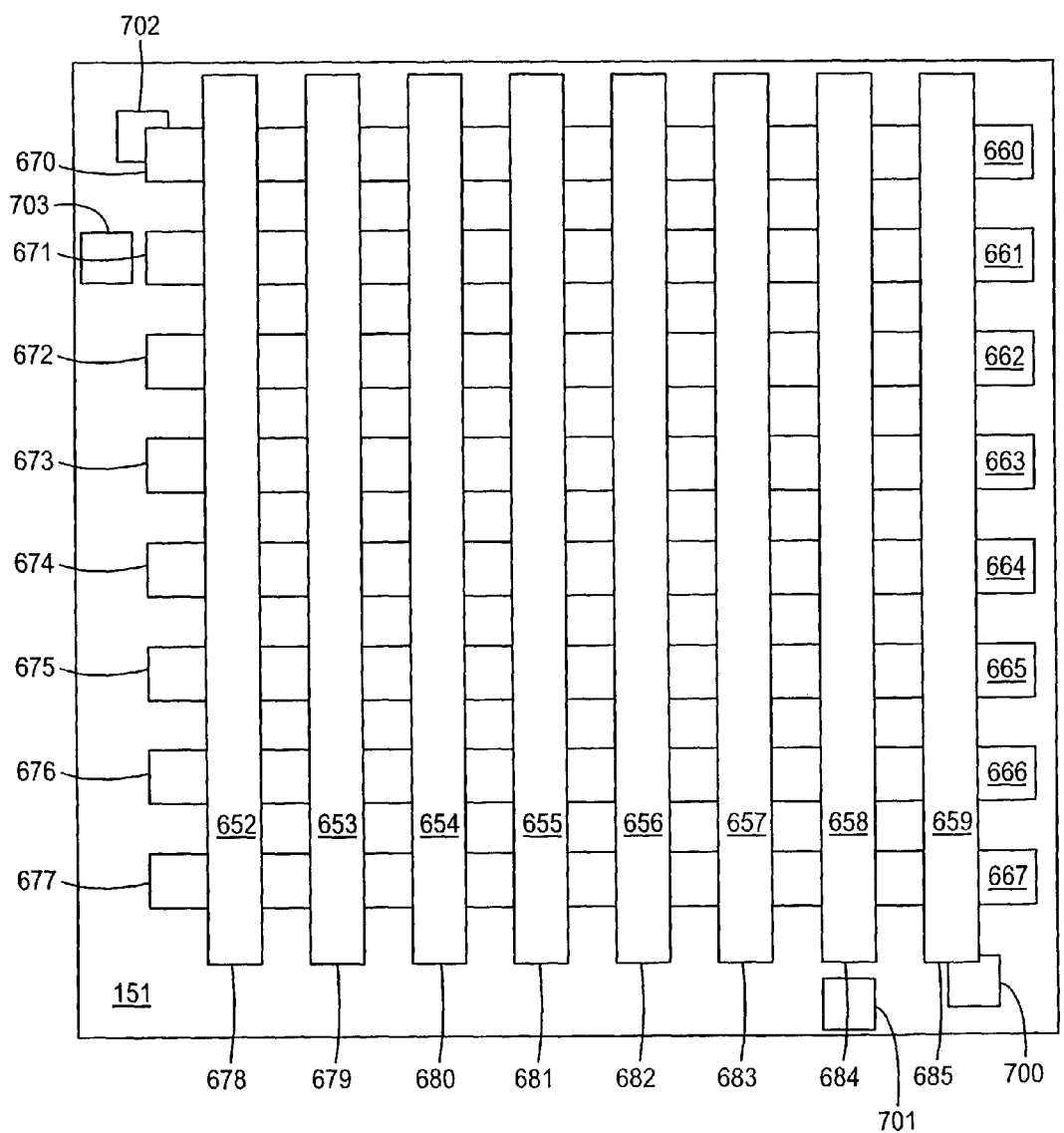
FIG. 16 is a simplified schematic of a grid capacitive touch screen sensor configured for automated touch simulation in accordance with an embodiment of the present invention.

Another touch screen sensor of a technology amenable to automated touch simulation is a grid capacitive touch screen sensor. FIG. 16 shows a grid capacitive touch screen in accordance with an embodiment of the present invention. Electrodes 652-667 are activated sequentially with an AC signal. A finger of stylus in proximity with one or more of the electrodes 652-667 capacitively couples to them and alters the impedance of the electrode in proportion to the magnitude of the capacitive coupling. This impedance change is measured on each electrode, and the relative changes are used to calculate position. Additional details of a grid capacitive touch screen sensor like the type depicted in FIG. 16 are disclosed in U.S. Pat. Nos. 4,686,332 and 5,844,506. Touch simulation on this type of touch screen sensor is similar to that associated with NFI capacitive touch screen sensors, in that a simulation electrode 700, 701, 702, 703 near one of the touch electrodes 652-667 or near the electrode connections 670-685 may be grounded or driven with a signal that will couple to touch electrodes and change the electrode's impedance to simulate a touch. Only four simulation electrodes are shown in FIG. 16 for simplicity. As few as one simulation electrode per dimension may be used, or as many as one per touch electrode.

As an alternative to simulation electrodes constructed on or near the touch sensor, capacitive coupling to touch electrodes 652-667 or electrode connections 670-685 may be accomplished by connecting standard capacitors to electrode connections 670-685. Such capacitors may be located on the sensor or its cable, or on the electronic controller that generates the signals that drive the sensor.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for use with a touch screen sensor comprising a substrate having a first surface and a second surface opposing the first surface, and an electrically conductive structure coupled to, or positioned proximate, the substrate and situated proximate the second surface, the method comprising:

applying a first signal to the first surface of the touch screen sensor;

applying a second signal to the conductive structure of the touch screen sensor, the first and second signals comprising AC voltage signals; and simulating a touch on the touch screen sensor by changing one of the first and second signals relative to the other of the first and second signals.

2. The method of claim 1, further comprising using the conductive structure as a shield against electrical noise.

3. The method of claim 1, wherein applying the first signal comprises applying the first signal at each of a plurality of corners of the first surface.

4. The method of claim 1, wherein simulating the touch comprises changing an amplitude of the first signal relative to an amplitude of the second signal.

5. The method of claim 1, wherein simulating the touch comprises changing a phase of the first signal relative to a phase of the second signal.

6. The method of claim 1, wherein simulating the touch comprises changing a frequency of the first signal relative to a frequency of the second signal.

7. The method of claim 1, wherein simulating the touch comprises changing the first signal and maintaining the second signal substantially constant.

8. The method of claim 1, wherein simulating the touch comprises changing the second signal and maintaining the first signal substantially constant.

9. The method of claim 1, wherein simulating the touch comprises changing both the first signal and the second signal.

10. The method of claim 1, further comprising receiving an initiation signal, and initiating the respective applying and simulating processes in response to the received initiation signal.

11. The method of claim 10, wherein the initiation signal is generated during a predetermined touch screen sensor routine.

12. The method of claim 10, wherein the initiation signal is generated during a start-up or shut-down routine of the touch screen sensor.

13. The method of claim 10, wherein the initiation signal is generated during an extended period of non-use of the touch screen sensor while the touch screen sensor is in an operating mode.

14. The method of claim 1, further comprising generating a message signal associated with the simulated touch.

15. The method of claim 14, further comprising communicating the message signal to a remote location.

16. A method for use with a touch screen sensor having a first surface, a second surface opposing the first surface, and a plurality of electrodes disposed on or proximate to the second surface, the method comprising:

applying a first signal to the first surface of the touch screen sensor;

applying one of a plurality of second signals to each of the plurality of electrodes disposed on or proximate to the second surface of the touch screen sensor; and simulating a touch on the touch screen sensor by changing a characteristic of at least one of the plurality of second signals relative to the first signal.

17. The method of claim 16, wherein the characteristic comprises an amplitude of the at least one of the plurality of second signals.

18. The method of claim 16, wherein the characteristic comprises amplitude, and the plurality of second signals have substantially equal amplitudes.

19. The method of claim 16, wherein the characteristic comprises amplitude, and the at least one of the plurality of second signals has an amplitude differing from an amplitude of others of the plurality of second signals.

20. The method of claim 16, wherein the characteristic comprises a frequency of the at least one of the plurality of second signals.

21. The method of claim 16, wherein the characteristic comprises frequency, and the plurality of second signals have substantially equal frequencies.

22. The method of claim 16, wherein the characteristic comprises frequency, and the at least one of the plurality of second signals has a frequency differing from a frequency of others of the plurality of second signals.

23. The method of claim 16, wherein the characteristic comprises a phase of the at least one of the plurality of second signals.

24. The method of claim 16, wherein the characteristic comprises phase, and the plurality of second signals have substantially equal phase.

25. The method of claim 16, wherein the characteristic comprises phase, and the at least one of the plurality of second signals has a phase differing from a phase of others of the plurality of second signals.

26. The method of claim 16, wherein applying the first signal comprises applying the first signal at each of a plurality of corners of the first surface.

27. A method for use with a touch screen sensor comprising a substrate having a first surface and a second surface opposing the first surface, and an electrically conductive structure coupled to, or positioned proximate, the substrate and situated proximate the second surface, the method comprising:
   applying first and second voltage signals of substantially equal amplitude respectively to the first surface and conductive structure;
   changing one or both of the first and second voltage signal amplitudes to develop a potential difference between the first surface and conductive structure of the touch screen sensor; and
   detecting a response to the potential difference as the simulated touch.

28. The method of claim 27, wherein developing the potential difference comprises applying a first AC voltage signal and a second AC voltage signal respectively to the first surface and conductive structure.

29. The method of claim 27, wherein developing the potential difference comprises varying a first voltage signal applied to the first surface and maintaining a second voltage signal applied to the conductive structure substantially constant.

30. The method of claim 29, wherein the second voltage signal comprises a DC voltage signal.

31. The method of claim 27, wherein developing the potential difference comprises varying a first voltage signal applied to the first surface and varying a second voltage signal applied to the conductive structure.

32. The method of claim 27, wherein detecting the response comprises detecting a change in currents detected at each of a plurality of locations of the first surface.

33. The method of claim 27, wherein detecting the response to the potential difference comprises detecting a current at each of a plurality of corners of the first surface, and converting each of the currents to corresponding values.

34. The method of claim 27, further comprising associating the detected response to the potential difference with a position of the simulated touch on the touch screen sensor.

35. The method of claim 27, further comprising receiving an initiation signal, and initiating the developing and detecting processes in response to the received initiation signal.

36. The method of claim 35, wherein the initiation signal is received from one of a remote location and a location proximate the touch screen sensor.

37. The method of claim 35, wherein the initiation signal is generated during a predetermined touch screen sensor routine.

38. A touch sensing system, comprising:
   a touch screen sensor comprising a substrate having a first surface and a second surface opposing the first surface;
   an electrically conductive structure coupled to, or positioned proximate, the substrate and situated proximate the second surface; and
   a controller coupled to the touch screen sensor, the controller configured to apply first and second signals respectively to the first surface of the touch screen sensor and the electrically conductive structure, the first and second signals comprising AC voltage signals, the controller configured to simulate a touch on the touch screen sensor by changing one of the first and second signals relative to the other of the first and second signals.

39. The system of claim 38, wherein the electrically conductive structure acts as a shield against electrical noise.

40. The system of claim 38, wherein the controller simulates the touch by changing an amplitude of the first signal relative to an amplitude of the second signal.

41. The system of claim 38, wherein the controller simulates the touch by changing a phase of the first signal relative to a phase of the second signal.

42. The system of claim 38, wherein the controller simulates the touch by changing a frequency of the first signal relative to a frequency of the second signal.

43. The system of claim 38, wherein application of the fist and second signals by the controller develops a potential difference between the first surface and the electrically conductive structure of the touch screen sensor, the controller detecting a response to the potential difference as the simulated touch.

44. The system of claim 38, further comprising a host computing system having a display, wherein the touch screen sensor is coupled to the display and the controller is communicatively coupled to the host computing system.

45. The system of claim 44, wherein the controller receives an initiation signal from the host processing system, and initiates the respective applying and simulating processes in response to the received initiation signal.

46. The system of claim 45, wherein the host processing system receives a touch simulation command signal from a remote source, the host processing system generating the initiation signal in response to the touch simulation command signal.

47. The system of claim 38, wherein the controller receives an initiation signal from a remote source, the controller initiating the respective applying and simulating processes in response to the received initiation signal.

48. The system of claim 47, wherein the initiation signal is generated during a predetermined touch screen sensor routine or a period of system idleness.

49. The system of claim 38, wherein the controller or a host processing system coupled to the controller generate a message signal associated with the simulated touch.

50. The system of claim 38, wherein the message signal is communicated to a remote location via a communication link.

51. A touch sensing system, comprising:
   a touch screen sensor having a first surface, a second surface opposing the first surface, and a plurality of electrodes disposed on or proximate to the second surface; and
   a controller coupled to the touch screen sensor, the controller configured to apply a first signal to the first surface of the touch screen sensor and applying one of a plurality of second signals to each of the plurality of electrodes disposed on or proximate to the second surface of the touch screen sensor, the controller configured to simulate a touch on the touch screen sensor by changing a characteristic of at least one of the plurality of second signals relative to the first signal.

52. The system of claim 51, wherein the controller simulates the touch by changing an amplitude of the at least one of the plurality of second signals.

53. The system of claim 51, wherein the characteristic comprises amplitude, and the controller maintains the plurality of second signals at substantially the same amplitude while changing an amplitude of the fist signal.

54. The system of claim 51, wherein the characteristic comprises amplitude, and the controller adjusts an amplitude of at least one of the plurality of second signals to an amplitude differing from an amplitude of others of the plurality of second signals.

55. The system of claim 51, wherein the controller simulates the touch by changing a frequency of the at least one of the plurality of second signals.

56. The system of claim 51, wherein the characteristic comprises frequency, and the controller maintains the plurality of second signals at substantially the same frequency.

57. The system of claim 51, wherein the characteristic comprises frequency, and the controller adjusts a frequency of at least one of the plurality of second signals to a frequency differing from a frequency of others of the plurality of second signals.

58. The system of claim 51, wherein the controller simulates the touch by changing a phase of the at least one of the plurality of second signals.

59. The system of claim 51, wherein the characteristic comprises phase, and the controller maintains the plurality of second signals at substantially the same phase.

60. The system of claim 51, wherein the characteristic comprises phase, and the controller adjusts a phase of at least one of the plurality of second signals to a phase differing from a phase of others of the plurality of second signals.

* * * * *

UNITED STATES PATENT AND TRADEMARK OFFICE
CERTIFICATE OF CORRECTION

PATENT NO. : 7,362,313 B2
APPLICATION NO. : 10/346325
DATED : April 22, 2008
INVENTOR(S) : Bernard O. Geaghan It is certified that error appears in the above-identified patent and that said Letters Patent is hereby corrected as shown below:

Column 5
Line 44; delete "LCD)" and insert -- LCD -- therefore.

Column 7
Line 3; delete "bidirectional" and insert -- bi-directional -- therefore.
Line 7; delete "unidirectional" and insert -- uni-directional -- therefore.

Column 9
Line 57; delete "the a second" and insert -- the second -- therefore.

Column 11
Line 36; delete "screen-sensor" and insert -- screen sensor -- therefore.

Column 16
Line 19, Claim 43; delete "fist" and insert -- first -- therefore.

Column 17
Line 4, Claim 53; delete "fist" and insert -- first -- therefore.

Signed and Sealed this

Sixteenth Day of September, 2008

JON W. DUDAS
*Director of the United States Patent and Trademark Office*